United States Patent [19]
Kim

[11] Patent Number: 5,144,438
[45] Date of Patent: Sep. 1, 1992

[54] MULTICHANNEL SCANNING METHOD

[75] Inventor: Yong-san Kim, Seoul, Rep. of Korea

[73] Assignee: Samsung Electronics Co., Ltd., Suwon, Rep. of Korea

[21] Appl. No.: 398,983

[22] Filed: Aug. 28, 1989

[30] Foreign Application Priority Data

Dec. 24, 1988 [KR] Rep. of Korea ............... 88-17401

[51] Int. Cl.$^5$ .................. H04N 5/262; H04N 5/45
[52] U.S. Cl. ..................... 358/183; 358/193.1; 358/181; 358/191.1; 358/22
[58] Field of Search ............ 358/183, 191.1, 192.1, 358/193.1, 140, 141, 142, 160, 185, 22, 56, 181, 22 PIP; 340/791, 717, 720

[56] References Cited

U.S. PATENT DOCUMENTS

| | | | |
|---|---|---|---|
| 4,636,864 | 1/1987 | Annegarn | 358/22 |
| 4,774,582 | 9/1988 | Hakamada | 358/22 |
| 4,779,134 | 10/1988 | Mak | 358/185 |
| 4,855,833 | 8/1989 | Kageyama | 358/181 |
| 4,870,492 | 9/1989 | Hakamada et al. | 358/193.1 |

Primary Examiner—James J. Groody
Assistant Examiner—Michael H. Lee
Attorney, Agent, or Firm—Robert E. Bushnell

[57] ABSTRACT

A multichannel scanning method for M-PIP TV system capable of displaying a plurality of sub-pictures on a main picture is disclosed which includes a first step of initializing the system, a second step of selecting and memorizing image video sources outputting image signals, a third step of successively outputting the image signals to a plurality of positions of the sub-pictures, and a fourth step of terminating the system operation in response to a multichannel scanning termination command. According to the method of the present invention, a multichannel scanning can be automatically carried out, and there is no possibility that a channel having no image signals can be outputted. Especially, even in the case where the number of channels to be scanned is larger than that of the displayable number of sub-pictures, scannings for the total amount channels can be carried out without being subjected to any restriction.

23 Claims, 5 Drawing Sheets

FIG. 5A

| 1 | 2 | 4 |
|---|---|---|
| 5 | 7 | 9 |
| 11 | 30 | 40 |

FIG. 5B

| 45 | 50 | 60 |
|---|---|---|
| 70 | 75 |  |
|  |  |  |

FIG. 5C

| 45 | 50 | 60 |
|---|---|---|
| 70 | 75 | 1 |
| 2 | 4 | 5 |

FIG. 5D

| 1 | 2 | 4 |
|---|---|---|
| 5 | 7 | 9 |
| 11 | 30 | 40 |

MULTICHANNEL SCANNING METHOD

FIELD OF THE INVENTION

The present invention relates to a multichannel scanning method, and particularly, to a multichannel scanning method for a M-PIP(multiple picture-in-picture) television which is capable of displaying of plurality of sub-pictures.

BACKGROUND OF THE INVENTION

In accordance with the digitalizing trend of the image signal processing method picture-in-picture, (PIP) televisions appeared, and these are indicative of those televisions which are capable of displaying sub-pictures in the form of moving or stationary images occupying a part or whole of the main picture.

Such a PIP television could display a main picture through a tuner, off-air broadcast source, and display moving or stationary images through a video tape recorder (VTR) or other non-broadcast video sources as sub-pictures during the early stage. Thereafter, a technique of swapping the main picture and sub-pictures was developed, and also, a system capable of simultaneously receiving two off-air broadcast video sources such as a 2-tuner system was developed.

Recently, video sources are diversified beyond off-air broadcast or VTR, for example, cable borne programming such as CATV, teletext or videotex, and RCG sources in computer graphics, video disc player, and video camera, and therefore, corresponding signal characteristics are also diversified. In order to process and display such diversified signals, the digitalization of the processing of video signals has been increasingly promoted.

The digital tuner which has appeared in conformity with such trends is capable of receiving video signals from a plurality of broadcasting sources simultaneously, and is capable of displaying them after multiplexing them, so that a plurality of broadcasting programs can be simultaneously displayed on the screen. This technique applied to the PIP TV is the so-called multiple PIP (M-PIP).

Such a multiple PIP TV can display a plurality of sub-pictures within a main picture, and therefore, can show various new functions which are not seen in the preceding PIP TV. One of the the new functions is the multichannel scanning function, and according to this function, the digital signals from the digital tuner can be successively output, so that programs broadcast by different broadcasting stations or programs from different video signals sources can be scanned, thereby performing the multichannel scanning function.

The conventional multichannel scanning method of such a multiple PIP TV is shown in FIG. 1, which was adopted, for example, by Matsushita Electric Company of Japan in its Hi-Fi VTR "NV-D21" sold from Dec. 1, 1986 (refer to the journal "Video Saloon", Decemeber 1986, page 139).

In this method, first, the user manipulates the ten keys to input data for the channel to be scanned and to store the data into the system, and then, the user presses the channel scan key to set a plurality of sub-pictures (4 sub-pictures in FIG. 1) on the screen. At the same time, the system successively writes and reads, to and from the relevant memory, the video signals for the selected and memorized channel, so that the stationary images for the memorized channels should be output as respective sub-pictures, thereby performing multichannel scanning.

The controlling of sub-pictures in the conventional multichannel scanning method will be described in further detail. First, a plurality of sub-pictures are turned on to the main picture, then the image for the first channel memorized is output to the first sub-picture P1, the the position (and the field of the memory for writing and reading) of the sub-picture to be output is moved to a second sub-picture P2, the selection of the channel is shifted up or down at the same time, and then, the signals for the memorized next channel are received, written and read out, thereby displaying the second sub-picture P2. Such operations are repeated to output the images for the respective channels until the final sub-picture (P4 in FIG. 1) is reached, the sub-picture thereupon being turned off. However, in this conventional multichannel scanning method, the user has the select the channels to be scanned to store them into the system and therefore, the operation is very troublesome. Further, if the user erroneously selects a channel lacking output signals, then only noise will be generated in the sub-picture, thereby failing proper scannings. Further, in this conventional method, the simultaneously scannable number of channels is limited to number of sub-pictures, and therefore, if it is desired that the channels be scanned in number greater than the number of sub-pictures, a reselection and a rescanning have to be performed, thereby causing further trouble in the operation of the system.

SUMMARY OF THE INVENTION

The present invention is intended to overcome the disadvantages of the conventional method.

Therefore, it is an object of the present invention to provide a multichannel scanning method in which only the channels or other video signal sources having outputs signals can be automatically scanned.

It is another object of the present invention to provide a multichannel scanning method in which, by a single operation, a large number of channels or video signal sources can be automatically scanned regardless of the maximum number of sub-pictures.

In achieving the above objects, the multichannel scanning method of the present invention, for a M-PIP TV system capable of displaying a plurality of sub-pictures on the main picture includes:

a first step of initializing the system in response to a multichannel scanning start command;

a second step of selecting and memorizing video sources outputting image signals through automatic channel selection;

a third step of successively outputting to a plurality of sub-pictures the image signals for the selected and memorized video signal sources; and a fourth step and terminating the system operation in response to a multichannel scanning termination command.

BRIEF DESCRIPTION OF THE DRAWINGS

The above objects and other advantages of the present invention will become more apparent by describing in detail the preferred embodiment of the present invention with reference to the attached drawings in which:

FIG. 5A-5D are schematic, illustration showing the operation of the method of the present invention, with the numeraly representing the selected channel numbers.

DESCRIPTION OF THE PREFERRED EMBODIMENTS

Figure 2:
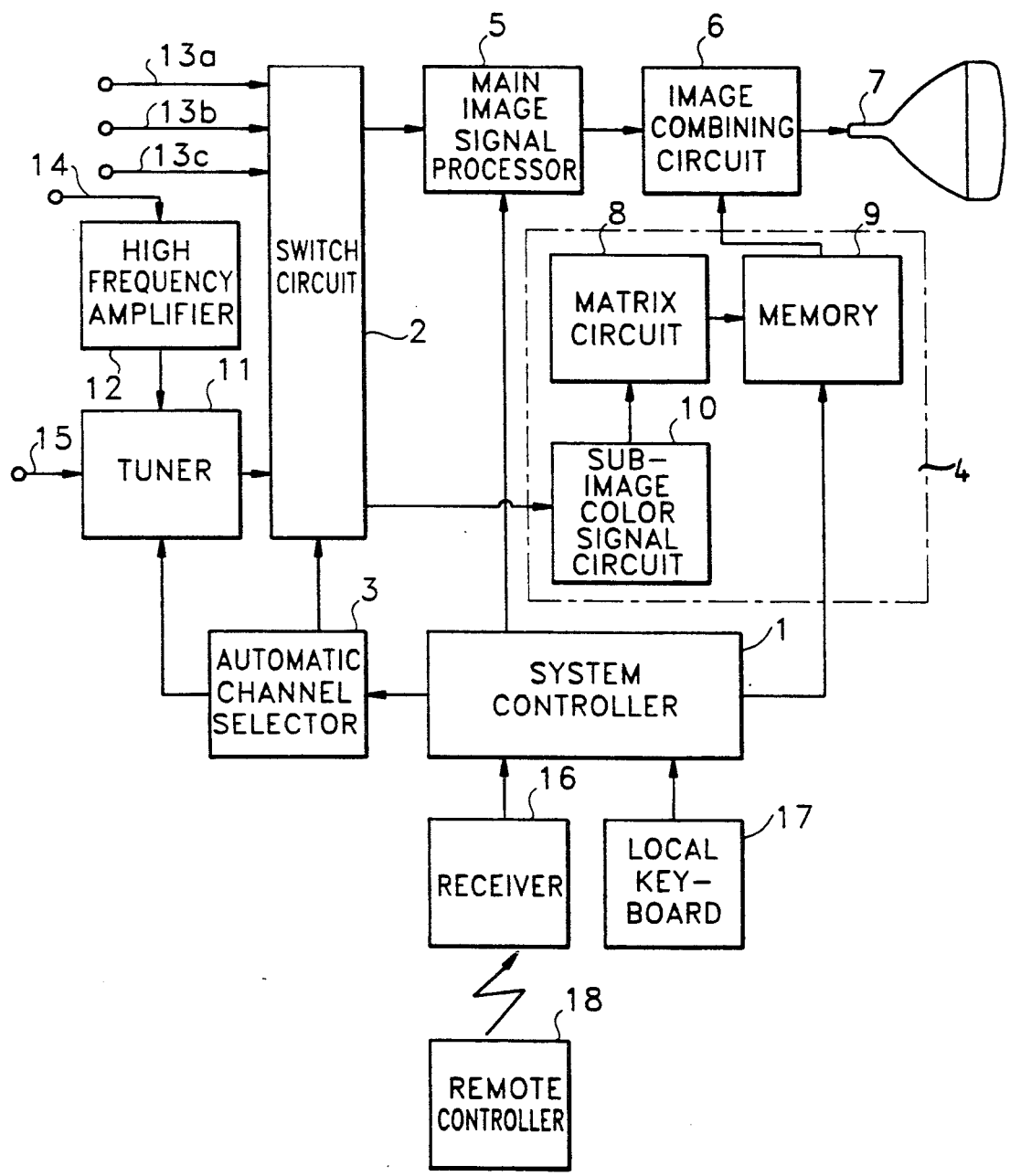
FIG. 2 illustrates a system of an M-PIP TV which is suitable for application of the method according to the present invention.

FIG.2 illustrates by example a system of an M-PIP TV suitable for carrying out the present invention, in which the non-related components such as the sound processing circuit are omitted for the sake of illustrating convenience.

In FIG. 2, reference numerals 13a, 13b, and 13c indicate external video signal input terminals for inputting the image transmitting signals of VTR or RGB signals of computer graphics. Reference number 11 indicates a tuner circuit for receiving, tuning and amplifying off-air broadcas signals inputted through an antena terminal 15, and for converting them to the required form. Reference number 14 indicates an auxiliary input terminal for receiving signals transmitted from a CATV and the like, and the signals on input terminal 14 are amplified by a high frequency amplifying circuit 12, and then, input into the tuner circuit 11. The tuner circuit 11 should desirably consist of, for example, a digital tuner which is capable of multiplexing the signals of a plurality of broadcasting sources, and outputting them simultaneously.

The video signals received from a plurality of video signal sources as described above are all delivered to a switch circuit 2 which is controlled by an automatic channel selecting circuit 3 which is in turn controlled by a system control circuit 1. The switch circuit 2 selects one or more video signals from among those input, and supplies them to either a main image signal processing circuit 5 or to a sub-image signal processing circuit 4.

The system control circuit 1 performs the overall controls so that the whole system can perform proper normal functions in accordance with the commands fed by the user through a remote controller 18 and a receiver 16 or a local keyboard 17. The remote controller 18 and the local keyboard 17 should desirably be provided with a multichannel scanning start key and a termination key in addition to the usually provided keys.

The sub-image signal processing circuit 4 converts the image signals selected by the switch circuit 2 in accordance with the operating mode, size, and number of the sub-pictures controlled by the system control circuit 1, and in accordance with the positions of the sub-pictures on the main picture controlled by the system control circuit 1, so that the above mentioned image signals can be displayed as sub-pictures. Then the sub-image signal processing circuit 4 outputs the above mentioned signals to an image combining circuit 6, so that the signals should be combined with the image signals output from the main image signal processing circuit 5, and that the main picture and the sub-pictures should be simultaneously or selectively output to a cathode ray tube 7.

The sub-image signal processing circuit 4 should desirably include a sub-image color signal circuit 10 for separately outputting R, G, B color signals after processing the image signals selected by the switch circuit 2; a matrix circuit 8 for converting the respective R, G, B color signals to color difference signals; and a memory 9 for storing the color difference signals.

The memory 9 contains a plurality of divided memory fields, in each of which a signal batch of sub-pictures can be stored. The number of the memory fields may be the same as the number of sub-pictures as in the conventional method, but desirably, the number of memory fields may be sufficiently larger to such an extent that, for example, the number should correspond to the maximum number of broadcast channels.

The system control circuit 1 contains a multichannel scanning program which is based on an embodiment of the present invention, and the operation of the program will be described in detail below referring to FIGS. 2 to 5.

Figures 1, 3:
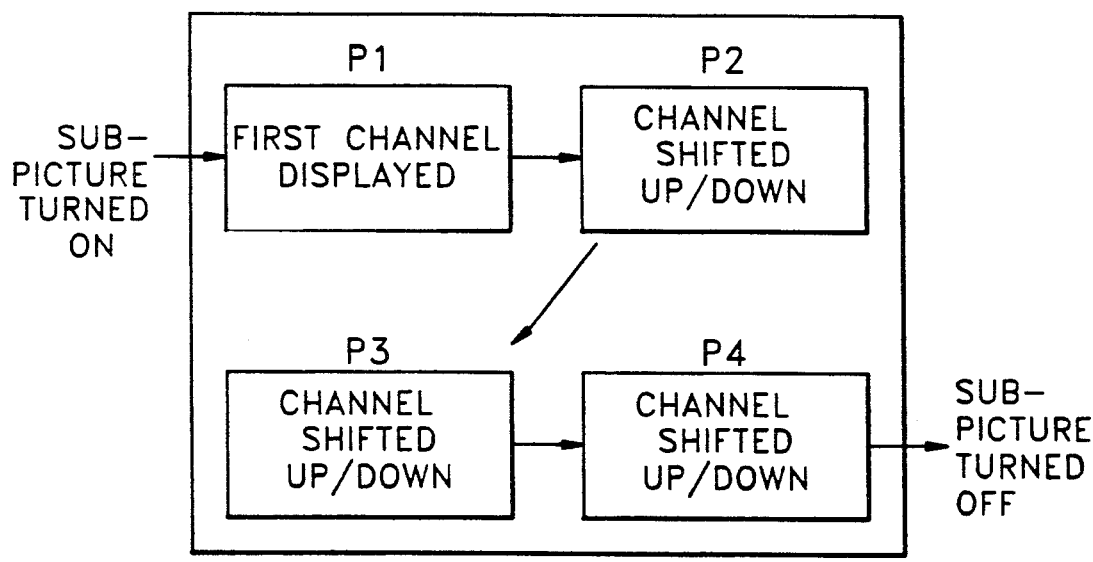
FIG. 1 is a block diagram showing the multichannel scanning method of the conventional M-PIP TV.
FIG. 3 illustrates the position of sub-pictures within the main picture.

As shown in FIG. 3, it is assumed, as a matter of description convenience, that the system most suitable for carrying out the present invention is a 9-PIP TV capable of displaying 9 sub-pictures P1 to P9. Of course, 1-PIP, 4-PIP or 12-PIP can be used without any inconvenience.

Figure 4A:
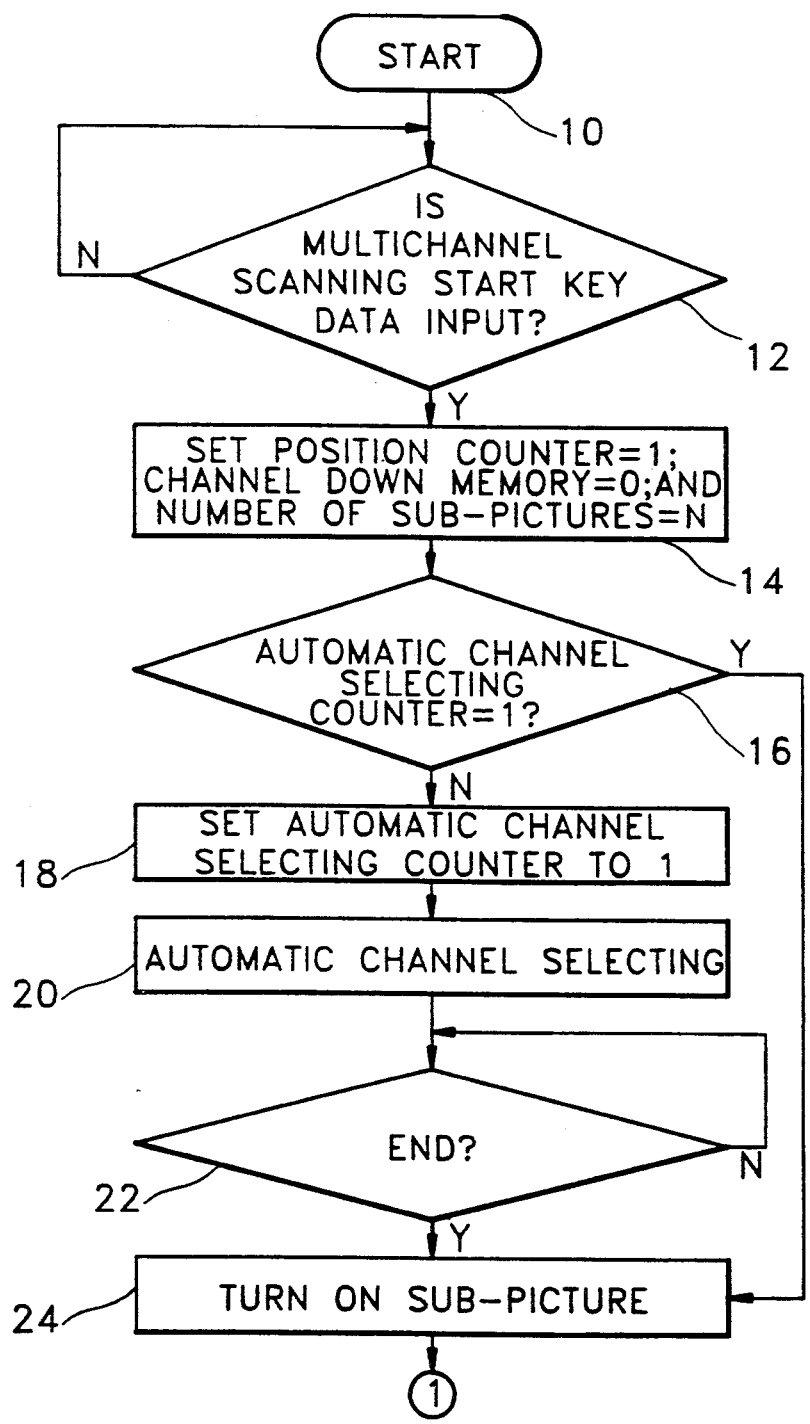
FIG. 4 (A, B) is a flow chart of the operating program for carrying out the present invention.
Figure 4B:
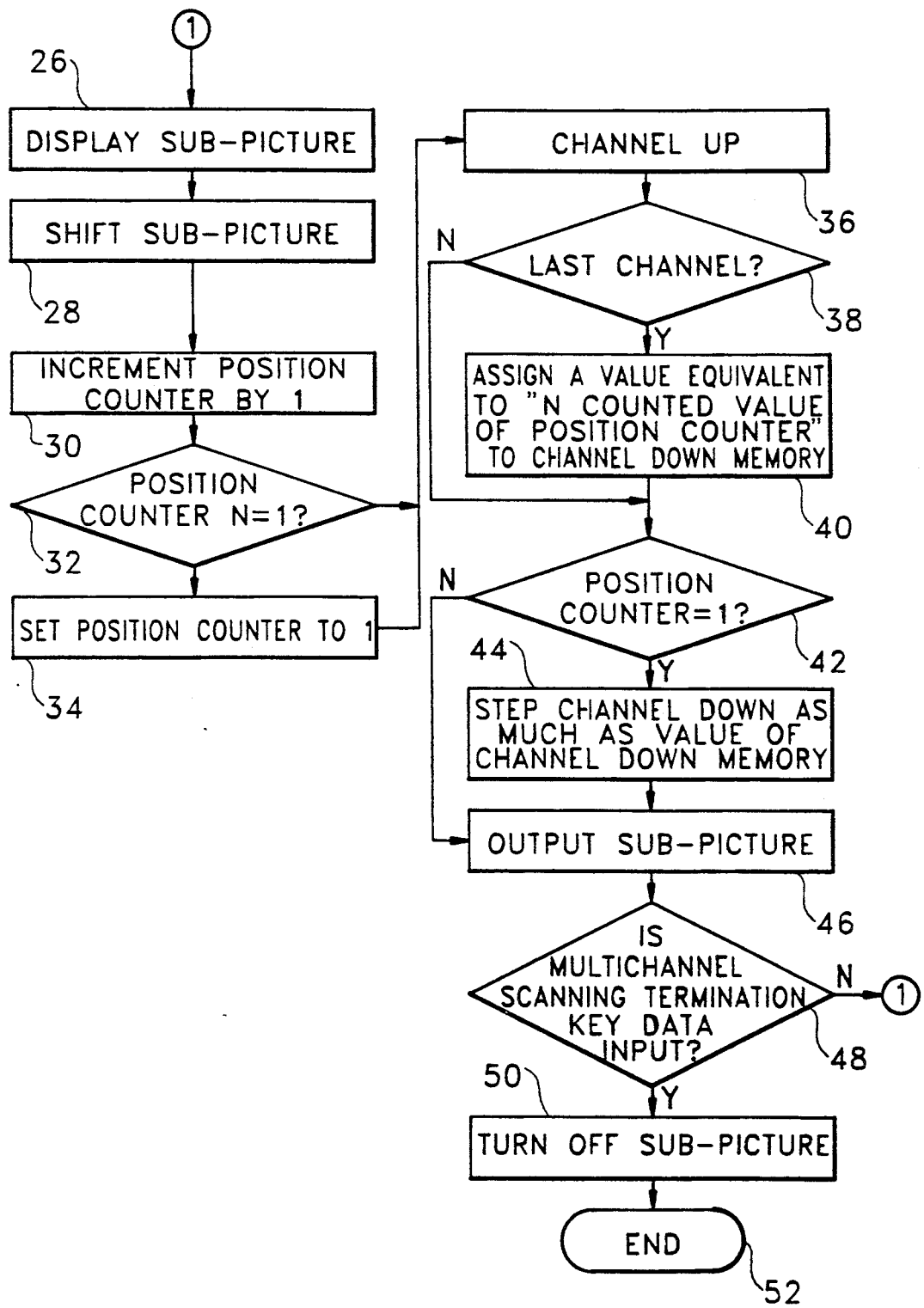

The operation of the operating program for the system control circuit 1, shown in FIG. 4(A, B), is started at the block 10 at which the system is turned on, and the image signals output outputted from a video source and selected by the switch circuit 2 are being displayed from the main image signal processing circuit 5 through the cathode ray tube 7.

During this operation, the system control circuit 1 constantly checks whether the user requests multichannel scanning, that is, whether the user is inputting multichannel scanning key data through a remote controller 18 or a local keyboard 17. (Block 12).

If there is no input of multichannel scanning key data, then the block 12 is carried out until multichannel scanning key data is received, and if it is received, then the function is transferred to block 14 where the position counter within the system control circuit 1 is set to "1", a channel down memory is set to "0", and the number N of sub-pictures is set, which is a 9-PIP according to the embodiment of the present invention, that is, N=9.

Then, a check is made as to whether the next automatic channel selecting counter is set to "1", that is, makes a judgement, as to whether automatic channel selection has already been made. (Block 16).

If automatic channel selection has not been made, then the automatic channel selection counter will be set to "1" at the block 18, the system control circuit 1 will activate the automatic channel selecting circuit 3, and the automatic channel selecting circuit 3 will successively check the channels tuned by the tuner circuit 11 to select and memorize the channels having broadcast signals. (Block 18). It will be assumed that the number of channels selected and memorized that have broadcast signals is 14, namely "1", "2", "4", "5", "7", "9", "11", "30", "40", "45", "50", "60", "70", and "75".

If final channel is detected at the block 20, that if there are no further channels having broadcast signals, then the channel selection will be terminated, and the function will be advanced to block 24 where the sub-picture turning-on operation for setting the sub-pictures will be carried out.

If the automatic channel selecting counter is set to "1" at the block 16, this corresponds, for example, to the case where repeated multichannel scanning is being carried out during the viewing of a program after selection of a channel upon completion of multichannel scanning. Therefore, in such a case, an automatic channel selection has been made and a channel having broadcasting signals has been selected and memorized, and therefore, a repeated execution of the blocks 18 to 22 does not have to be made, with the result that the function will be directly advanced to block 24.

The sub-picture turning-on operation at block 24 is carried out in such a manner that memory fields are set in the same number as the number of the selected channels (14 in the embodiment of the present invention) stored in the memory 9 of the sub-image signal processing circuit 4, and the respective memory fields are cleared, so that an enable state is brought, thereby making it possible to set up a state capable of writing/reading the image signals.

As shown in FIG. 3, all the sub-pictures can be turned on to the main picture from the beginning, but in such a case, except the sub-pictures which are outputting image signals after the completion of the sub-picture processing, the sub-pictures which are outputting no image signals will generate only noise, and therefore, it is desirable that the sub-pictures are successively displayed starting from those for which the image processing has been completed.

If the sub-pictures are ready for displaying at the block 24, then the image signals for the first channel selected and memorized are output to the first sub-picture P1 at the block 26. This will be described in further detail below referring to FIG. 2. The image signals for the channel "1", (i.e., the first channel), memorized in the system control circuit 1 will be tuned, amplified and received by the tuner circuit 11 and these received image signals will be supplied to the sub-image signal processing circuit 4. The sub-image color signal circuit 10 of the sub-image signal processing circuit 4 will convert the input image signals to R, G, B color signals (and vertical and horizontal synchronizing signals) which will be supplied in turn to the matrix circuit 8. The matrix circuit 8 will convert the input color signals to luminance signals and color difference signals which will be written in turn into the first memory field corresponding to the first sub-picture P1 within the memory 9.

Then the system control circuit 1 will reduce the size of the sub-picture represented by the input image signals in consideration of the size of the main picture (for example, in the case of a 9-PIP, the reduction ratio will be 1/3), and the position of the first sub-picture P1 will be set to the upper left part of the main picture. Then the image signals stored in the memory 9 will be read out, and sent to the image combining circuit 6, and the image combining circuit 6 will output combined picture signal to the cathode ray tube 7, for displaying the first channel sub-picture to the position of the first sub-picture P1 on the main picture.

Here, if the sub-picture is to display motion, the image signals for the sub-picture have to be repeatedly written and read to and from the memory 9. However, channel scanning is the object of the present invention, and therefore, it will be sufficient to display a stationary picture by outputting a batch of image signals corresponding to one batch of sub-pictures.

Further, in the descriptions presented above, there has been no mention as to whether the image signals are analog or digital signals, but this will be defined such that proper conversions will be made so as for the image signals to become digital in being written and read to and from the memory 9, and to become analog when being output to the cathode ray tube 7.

Upon completion of the output of the sub-picture corresponding to the first channel "1" onto the first sub-picture P1, the system control circuit 1 will move the position of the next sub-picture to the second sub-picture P2, and will be ready for writing and reading to and from the second memory field of the memory 9. (Block 28).

Further, after completion of the displaying of the image signals corresponding to the channel "1", (i.e., the first channel), onto the first sub-picture P1, the counted value of the position counter will be incremented by "1" at the block 30.

At the block 32, a check will be made as to whether the next sub-picture can be simultaneously accommodated together with the other sub-pictures on the main picture. That is, the number of the sub-pictures displayable within a single picture is N, and therefore, a (N+1) th channel and channels thereafter can be displayed after clearing of the whole picture, or one or more sub-pictures. Therefore, if the position counter shows N+1, the sub-picture is recognized as the last one of the displayable sub-pictures in a single main picture, and the function is advanced to the block 34, while, if the counted value of the position counter is less than N+1, the function is advanced to the block 36.

At the block 36, the system control circuit 1 will control the tuner circuit 11 through the automatic channel selecting circuit 3 in such a manner that the image signals for the memorized second channel, (i.e., the channel "2"), should be receivable.

Then, a judgement will be made as the whether it is the final channel memorized (block 38), and if not, the operation will be transferred to the block 42.

Then, at the block 42, a check will be made as to whether the value of the position counter shows "1", that is, as to whether it is the channel to be displayed to the first sub-picture P1, and if not, the operation will be advanced to the block 46 where the image signals corresponding to the second channel are output to the second sub-picture P2.

At the block 48, a check will be made as to whether multichannel scanning termination key data has been input, and if not, the operation will return to block 26 ( block 26 is a continuation state of the block 46) where scanning for subsequent channels will be successively carried out, so that the image signals for the selected respective channels "1", "2", "4", . . . . . , "30", "40" should be successively output to the respective sub-pictures P1 to P9 as shown in FIG. 5a.

Under the condition described above, the counted values of the position counter will correspond to the respective sub-pictures P1 to P9.

Now the process of outputting the channel "45" after outputting the channel "40" to the sub-picture P9. is the final sub-picture, will be described.

After outputting the image signals for channel "40" to the 9th sub-picture P9 at the block 26, the system control circuit 1 will make ready the tenth memory field within the memory 9 of the sub-image signal processing circuit 4 at the block 28.

At the block 30, the position counter will be incremented by "1", and then, the counted value of the position counter will become 10 because "1" had been incremented 9 times before.

Therefore, the counted value of the position counter will be equivalent to (N=9)+1, in which N is the displayable number of sub-pictures, and therefore, the operation will be advanced to the block 34 where the position counter will be set to "1", thereafter the operation being advanced to the block 36.

At the block 36, the next channel "45" will be selected, the tuner circuit 11 will start the input of the relevant image signals, and the operation will advance to the block 42 because the block 38 is not encountered with the final channel.

The operation will be advanced from the block 42 to the block 44 because the position counter is set to "1" at the block 34.

At the block 44, channel "45" which is set at the block 36 will undergo no change because the channel down memory is assigned with a value "0" at the block 14.

At the block 46, the image signals for the channel "45" will be output to the first sub-picture P1. Here, the outputs sub-pictures for channels "1" to "40" either can be cleared simultaneously, or can be successively replaced starting from the first sub-picture P1, but in the method of the present invention, it is assumed that they are simultaneously cleared, and then, a next channel is output.

At the block 48, if multichannel scanning termination key data is not input, the operation will be advanced to the block 26 where the subsequent channels will be successively displayed as shown in FIG. 5b by outputting the image signals for the respective sub-pictures.

Now the process of outputting the channel "75" which is the final channel will be described.

The channel "75" will be output at the block 26, then the next memory field will be made ready at the block 28, and the value of the position counter will be incremented by "1" at the block 30. At this time, the value of the position counter will become "5", and therefore, the channel "75" will be displayed to the fifth sub-picture P5.

At the block 32, the counted value of the position counter will not be N+1, and therefore, the operation will be advanced to the block 36 where the next channel (i.e., the channel "75") will be selected. This channel "75" should be the final one at the block 38, and therefore, the operation will advance to the block 40.

At the block 40, the channel down memory is assigned with a value equivalent to N minus the value of the position counter, and therefore, the channel down memory will be assigned with "4" because the displayable number of the sub-pictures according to the embodiment of the present invention is N=9, and the current value of the position counter is "5".

At the block 42, the value of the position counter is not "1", and therefore, the sub-picture for the channel "75" will be displayed at the block 46. If multichannel scanning termination key data is not input, the operation will be returned to the block 26 where the displays will be resumed starting from the first channel, so that the channels "1", "2", "4", "5" should be respectively displayed to the positions of the sub-pictures P6 to P9 as shown in FIG. 5C.

Then, the count value of the position counter is set to "1" again at the block 34 as the position of the sub-picture onto the main picture corresponds to the first sub-picture P1, and channel "7" is selected at the block 36. And at the block 42, it will be advanced to the block 44 as the count value of the position counter is "1".

At the block 44, as the channel down memory has been assigned with a value "4" since the channel "75", the final channel, was found, and therefore, count downs will be made from the channel "7" to the channel "1". That is, the channel "1" will be output to the position of the first sub-picture P1, and then, the subsequent channels will be successively output, thereby forming the state of FIG. 5d, which is equivalent to FIG. 5a.

At the block 48, if multichannel scanning termination key data is input, then the operation will be advanced to the block 50 where the displaying of sub-pictures will be turned off, the respective sub-picture memory fields within the memory 9 of the sub-image signal processing circuit 4 will be cleared, and the program will be terminated at the block 52.

At the termination of the program, the system will continue in its primary operations, that is, other M-PIP functions such as two-channel simultaneous display function, or a multi strobe function such as step-by-step operation function will be carried out. Under this condition, the channels which have been automatically selected are in a memorized state, and therefore, if multichannel scanning start key data is input, a multichannel scanning operation can be resumed at any time.

In the above, descriptions were made as if multichannel scanning is carried out only for a plurality of broadcasting video sources, but it should be noted that multichannel scannings can be made, for example, for other external video sources such as CATV, video camera or videotex.

In the above, descriptions were also made as if the displayable number of sub-pictures is fixed to N, but actually, it can be designed such that the number of sub-pictures and the number of memory fields are variable depending on the number of automatically selected and memorized channels. For example, if the number of channels to be scanned is less than 4, then the sub-pictures being displayed on the main picture can be provided in 4, while, if the number of such channels is 7, then the sub-pictures can be provided in 9.

As described above, according to the present invention, without performing troublesome operations by the user, a multichannel scanning for video sources outputting image signals can be easily carried out, and there is no possibility that a channel having only noise can be output. Especially, even in the case where the number of channels to be scanned is larger than that of the displayable number of sub-pictures, scannings for the total channels can be made without being subjected to any restriction at any time, and depending on the need, repeated automatic scannings are possible for the total channels at any time. Therefore, the present invention holds the useful feature of markedly improving the function of M-PIP TV.

What is claimed is:

1. A multichannel scanning method for a multiple picture-in-picture television system capable of displaying a plurality of sub-pictures on a main picture, comprising the steps of:

initializing said system in response to a multichannel scanning start command to enable display video images from different channels of reception for sources of video image signals;

selecting and storing a sequence of a plurality of said channels, each of said channels having a respective image signal;

successively delivering image signals of said sources for a first plurality of said plurality of channels within said sequence to a respective first number of positions on said main picture for display of sub-pictures;

setting the remaining sub-pictures of said plurality of sub-pictures;

delivering remaining image signals for corresponding ones of said plurality of channels not included in said first plurality, successively to said first number of positions;

upon display of an image signal from a final one of said plurality of sources, re-displaying a sub-picture corresponding to a first one of said sources, and successively displaying sub-pictures corresponding to said sources within said sequence; and terminating said system operation in response to a multichannel scanning termination command.

2. The multichannel scanning method as claimed in claim 1, further comprised of storing data representing said plurality of selected and memorized video sources after performing said step of terminating said system operation.

3. The multichannel scanning method as claimed in claim 1, wherein if a number of selected and stored image signals from said plurality of channels exceeds a displayable number of said plurality of sub-pictures, then successively displaying a number of sub-pictures displayed on a single main picture, and subsequently displaying image signals not displayed successively starting from a position of said first of said plurality of sub-pictures.

4. The multichannel scanning method as claimed in claim 1, re-displaying a sub-picture corresponding to a first one of said sources, and successively displaying sub-pictures corresponding to each of said sources until said terminating of said system operation.

5. The multichannel scanning method as claimed in claim 1, wherein upon completion of said re-display, each image signal of said plurality of sources through a position of a last sub-picture, said first image signal of said first source will again be displayed in said position of said first sub-picture, and successively displaying subsequent sub-pictures corresponding to said plurality of sources.

6. The multichannel scanning method as claimed in claim 3, wherein upon display of an image signal from a final one of said plurality of video sources, starting said display again with said first video source, and continuing said display of sub-pictures successively and repeatedly.

7. A multichannel scanning method for a multiple picture-in-picture television system capable of displaying a plurality of sub-pictures on a main picture, comprising the steps of:

initializing said system in response to a multichannel scanning start command;

selecting and memorizing a sequence of a plurality of video image signal sources, with each of said video image signal sources having an image signal, through automatic channel selections;

delivering a first image signal from a first of said plurality of video image signal sources within said sequence to a first of the plurality of sub-pictures;

successively delivering remaining image signals from said plurality of video signals within said sequence to the plurality of sub-pictures;

successively and repeatedly displaying image signals from said plurality of video image signal sources within said sequence and not displayed, starting from a position of a first sub-picture, if a number of selected and memorized video image signal sources within said sequence exceeds a displayable number of sub-pictures;

successively and repeatedly re-displaying the first image signal from said first of said video image signal sources again, upon displaying of an image signal of a final image signal from a final video image signal source of said plurality of video image signal sources within said sequence;

successively and repeatedly re-displaying the image signals of said plurality of video image signal sources within said sequence starting in the position of the first sub-picture upon completion of re-displaying the plurality of image signals in said sequence through the position of the last sub-picture;

terminating the system operation in response to a multichannel scanning termination command; and storing data for the selected and memorized video sources.

8. A device for producing multichannel scanning in a multiple picture-in-picture television, comprising:

a system control circuit for maintaining a sequence of channels of reception for sources of video image signals;

a high frequency amplifying circuit for amplifying first signals;

a tuner circuit coupled to receive said amplified first signals from said high frequency amplifier and second signals through an antenna terminal, for tuning and amplifying said first and second signals;

selecting circuit means, for checking channels tuned by said tuner circuit to determine whether channels within said sequence have said video image signals;

a switch circuit, controlled by said selecting circuit means, coupled to receive said first and second signals, for serially and successively selecting one or more of said second signals on said channels within said sequence determined by said selecting circuit means to have said video image signals and said first signals;

a main image signal processing circuit coupled to receive third image signals selected by said switch circuit;

a sub-image signal processing circuit coupled to convert fourth image signals corresponding to said video image signals from said sources within said sequence selected by said switch circuit in accordance with operating mode, size and number of sub-pictures within said sequence maintained by said system control circuit;

an image combining circuit for combining said first and second image signals of said main and sub image signal processing circuits;

said sub-image signal processing circuit successively delivering to said image combining circuit, according to said sequence, a first plurality of said fourth image signals corresponding to a first plurality of channels within said sequence, for a respective first number of positions on a main picture for display of sub-pictures corresponding to said first plurality of said channels, and if said first plurality of channels occupy all of said first number of positions, serially delivering image signals for corresponding ones of said plurality of channels within said sequence but not included in said first plurality, successively to said positions within said first number of positions for display of sub-pictures corresponding to said channels not included in said first plurality; and means for displaying said combined image signals produced in said image combining means.

9. A device as claimed in claim 8, wherein said sub-image signal processing circuit comprises:

sub-image color signal means, coupled to receive said fourth image signals selected by said switch means for processing and producing red, green and blue color signals from said received image signals;

a matrix circuit for converting respective red, green and blue color signals into color difference signals; and memory means for storing respective color difference signals generated in said matrix means.

10. A device as claimed in claim 9, wherein said memory means comprises a plurality of divided memory fields, each for storing a single batch of sub-picture data.

11. A multichannel television scanning process, comprising the steps of:

generating a multichannel scanning start command to initiate display of video images from different channels of reception for sources of video image signals;

determining whether a plurality of said channels have been selected in a sequence;

if a plurality of said channels have been selected in said sequence, successively delivering according to said sequence, image signals from said sources for a first plurality of the plurality of channels within said sequence to a respective first number of positions on a main picture for display of sub-pictures corresponding to said first plurality of said channels;

if said first plurality of channels occupy all of said first number of positions, serially delivering image signals for corresponding ones of said plurality of channels within said sequence but not included in said first plurality, successively to said positions within said first number of positions for display of sub-pictures corresponding to said channels not included in said first plurality; and terminating the multichannel scanning in response to a multichannel scanning termination command.

12. The multichannel scanning process of claim 11, further comprised of terminating said display of all sub-pictures corresponding to said first plurality of said channels before display of sub-pictures corresponding to said channels not included in said first plurality.

13. The multichannel scanning process of claim 11, further comprised of performed said step of delivering remaining image signals for corresponding ones of said plurality of channels not included in said first plurality, by serially terminating said display of sub-pictures corresponding to successive ones of said first plurality of said channels and serially providing display of successive ones of sub-pictures corresponding to said channels not included in said first plurality.

14. The multichannel scanning process of claim 11, further comprised of selecting said first number prior to display of sub-pictures corresponding to said first plurality of said channels.

15. The multichannel scanning process of claim 12, further comprised of selecting said first number prior to display of sub-pictures corresponding to said first plurality of said channels.

16. The multichannel scanning process of claim 13, further comprised of selecting said first number prior to display of sub-pictures corresponding to said first plurality of said channels.

17. The multichannel scanning process of claim 11, further comprised of repeating said steps of successively delivering image signals of said sources for a first plurality of said plurality of channels and of delivering image signals for corresponding ones of said plurality of channels not included in said first plurality successively to said first number of positions for display of sub-pictures corresponding to said channels not included in said first plurality, according to said sequence, until terminating the multichannel scanning in response to a multichannel scanning termination command.

18. A multichannel television scanning process, comprising the steps of:

generating a multichannel scanning start command to initiate display of video images from different channels of reception for sources of video image signals;

forming a sequence of said different channels currently receiving video image signals;

determining whether a plurality of said channels have been selected in a sequence;

if a plurality of said channels have been selected in said sequence, successively delivering according to said sequence image signals from said sources for a first plurality of said plurality of channels within said sequence to a serial array of positions on a main picture for a serial display of sub-pictures corresponding to said first plurality of said channels, within said positions; and repeating said serial display of sub-pictures within said serial array until reception of a multichannel scanning termination command.

19. The multichannel scanning process of claim 18, further comprising the steps of:

if said first plurality of channels occupy all of said first number of positions, serially delivering image signals for corresponding ones of said plurality of channels within said sequence but not included in said first plurality of channels, to said positions for serial display of sub-pictures corresponding to said channels not included in said first plurality; and repeating said delivery of image signals according to said sequence, for serial display of sub-pictures within said serial array until reception of said multichannel scanning termination command.

20. The multichannel scanning process of claim 18, further comprised of, if said first plurality of channels occupy all of said first number of positions, simultaneously terminating said display of all sub-pictures corresponding to said first plurality of said channels before display of sub-pictures corresponding to said channels not included in said first plurality.

21. The multichannel scanning process of claim 18, further comprised of, if said first plurality of channels occupy all of said first number of positions, performing said step of delivering remaining image signals for corresponding ones of said plurality of channels not included in said first plurality, by serially terminating said display of sub-pictures corresponding to successive ones of said first plurality of said channels and serially providing display of successive ones of sub-pictures corresponding to said channels not included in said first plurality.

22. The multichannel scanning process of claim 19, further comprised of simultaneously terminating said display of all sub-pictures corresponding to said first plurality of said channels before display of sub-pictures corresponding to said channels not included in said first plurality.

23. The multichannel scanning process of claim 19, further comprised of performing said step of delivering remaining image signals for corresponding ones of the plurality of channels not included in said first plurality, by serially terminating said display of sub-pictures corresponding to successive ones of said first plurality of said channels and serially providing display of successive ones of sub-pictures corresponding to said channels not included in said first plurality.

* * * * *

UNITED STATES PATENT AND TRADEMARK OFFICE
CERTIFICATE OF CORRECTION

PATENT NO. : 5,144,438

DATED : September 1, 1992

INVENTOR(S) : Yong-San Kim

It is certified that error appears in the above-identified patent and that said Letters Patent is hereby corrected as shown below:

Claim 13, Column 11, line 57, change "performed" to --performing--.

Signed and Sealed this

Fifth Day of October, 1993

Attest:

BRUCE LEHMAN

Attesting Officer

Commissioner of Patents and Trademarks